United States Patent
Wang et al.

(10) Patent No.: US 8,230,239 B2
(45) Date of Patent: Jul. 24, 2012

(54) MULTIPLE POWER MODE SYSTEM AND METHOD FOR MEMORY

(75) Inventors: Feng Wang, San Diego, CA (US); Shiqun Gu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 12/417,309

(22) Filed: Apr. 2, 2009

(65) Prior Publication Data

US 2010/0257379 A1 Oct. 7, 2010

(51) Int. Cl.
G06F 1/00 (2006.01)
G06F 1/26 (2006.01)
G06F 12/00 (2006.01)
G11C 5/14 (2006.01)

(52) U.S. Cl. ........ 713/300; 713/320; 711/100; 711/200; 365/227

(58) Field of Classification Search .................. 713/300, 713/320; 711/100, 200; 365/227
See application file for complete search history.

(56) References Cited

U.S. PATENT DOCUMENTS

| | | | | |
|---|---|---|---|---|
| 6,327,664 | B1 * | 12/2001 | Dell et al. | 713/323 |
| 7,058,823 | B2 * | 6/2006 | Lapidus | 713/300 |
| 7,480,808 | B2 * | 1/2009 | Caruk et al. | 713/300 |
| 7,773,689 | B2 * | 8/2010 | Dreps et al. | 375/295 |
| 7,804,732 | B2 * | 9/2010 | Van Berkel | 365/226 |
| 2001/0011356 | A1 | 8/2001 | Lee | |
| 2008/0162951 | A1 | 7/2008 | Kenkare | |
| 2008/0235528 | A1 | 9/2008 | Kim | |
| 2009/0063791 | A1 * | 3/2009 | Cho | 711/154 |
| 2009/0106569 | A1 * | 4/2009 | Roh et al. | 713/300 |
| 2009/0249102 | A1 | 10/2009 | Yong et al. | |

OTHER PUBLICATIONS

International Search Report—PCT/US2010/029829, International Search Authority—European Patent Office Aug. 5, 2010.
Written Opinion—PCT/US2010/029829, International Search Authority—European Patent Office Aug. 5, 2010.
Micron Technology, Inc., "Calclulating Memory System Power for DDR," TN4603.p65—Rev. May 1, 2001, pp. 1-15.

* cited by examiner

*Primary Examiner* — Stefan Stoynov
(74) *Attorney, Agent, or Firm* — Michelle Gallardo; Nicholas J. Pauley; Jonathan T. Velasco

(57) ABSTRACT

A memory power management system and method supporting multiple power modes for powering memory channels. The power management system can include a memory controller that controls the memory channel; a throughput detector that detects a requested throughput of the memory channel; a power control logic that determines a desired power mode corresponding to the requested throughput; and a power control device that supplies a desired voltage of the desired power mode to the memory channel. The power management system can include multiple memory controllers for controlling a multi-channel memory independently. The method includes detecting a requested throughput for the memory channel; determining a desired voltage related to the requested throughput; requesting the desired voltage from a voltage device; and applying the desired voltage to the memory channel. In some embodiments, the method only applies the desired voltage if it does not change for a threshold time duration.

22 Claims, 5 Drawing Sheets

MULTIPLE POWER MODE SYSTEM AND METHOD FOR MEMORY

FIELD OF DISCLOSURE

The present disclosure relates generally to digital memory subsystems, and more particularly, to a method and system that provides power management of memory channels within a memory subsystem.

BACKGROUND

Increases in processor performance and the development of multi-core, multi-threaded processors have led to a rapidly increasing need for more memory bandwidth and capacity. To keep up with the increasing demands for data bandwidth and capacity, memory subsystems have had to increase both their frequency of operation and density. Many conventional systems provide power management with system-level temperature control via feedback cooling systems and/or system-level voltage/current control. Cooling systems are designed to reduce the overheating of the memory subsystem as a whole. Designing cooling systems to provide sufficient cooling capacity for these high density memory systems can be difficult as the cooling systems have to keep up with the increasing density of memory chips.

High power consumption in mobile devices also remains a challenging issue. The high bandwidth requirements of high end mobile devices, for example mobile phones and PDAs, exacerbate the problem. A memory channel consumes different amounts of power depending on its power mode or state, but the power mode also affects the memory bandwidth. A "power down" state uses the least power as it shuts off the memory channel, but during the power down state, the memory channel cannot be accessed. Entering and exiting the power down state can also have a significant performance overhead. In an "operation" state the memory channel consumes more power but is ready to respond to memory requests.

There can be more than one level or power mode in the operation state of a memory channel. In general, levels with greater throughput or bandwidth have greater power requirements. Many current memory systems use wire bond or off chip double data rate (DDR) memory. The number of interconnects between the DDR memory and processors is limited, and thus supporting multiple channels with separate input/output and $V_{dd}$ would be difficult. Other systems use a technique of powering down the memory channel. To power down the channel, the channel can not be accessed, and there is a performance overhead in entering and exiting the power down state.

Thus, it would be desirable to reduce the power consumption of the memory devices without having a significant impact on the memory bandwidth or capacity.

SUMMARY

Disclosed is a memory power management system supporting multiple power modes. The memory power management system can include a memory controller, a throughput detector, power control logic and a power control device. The memory controller controls a memory channel. The throughput detector detects a requested throughput of the memory channel. The power control logic determines a desired power mode corresponding to the requested throughput of the memory channel, where the desired power mode is one of the multiple power modes. The power control device supplies a desired voltage to the memory channel where the desired voltage corresponds to the desired power mode.

The throughput detector and the power control logic can be part of the memory controller. The power control device can be a voltage regulator that includes a voltage input for receiving a supply voltage, and a power circuit for transitioning the supply voltage to the desired voltage. The power control device can be a voltage selector that includes a plurality of selectable voltages, each of the selectable voltages corresponding to one of the plurality of power modes; and a selector device that selects the desired voltage from the plurality of selectable voltages. The plurality of selectable voltages can be supplied by a power management circuit. The memory power management system can include a memory crossbar, where the throughput detector is integrated into the memory crossbar. The power control device can also supply the desired voltage to the memory controller.

The memory power management system can include multiple memory controllers for controlling a multi-channel memory, where each memory controller controls one channel of the multi-channel memory. For a multi-channel memory, the throughput detector can detect a requested throughput for each memory channel; the power control logic can determine a desired power mode for each memory channel corresponding to the requested throughput for that memory channel; and the power control device can supply a desired voltage to each memory channel of the multi-channel memory, the desired voltage for each memory channel corresponding to the desired power mode for that memory channel.

Also disclosed is a method for controlling the power applied to a memory channel. The method performs functions of detecting a requested throughput for the memory channel; determining a desired voltage related to the requested throughput; requesting the desired voltage from a voltage device; and applying the desired voltage to the memory channel. The method can also include determining whether the desired voltage is different from a current voltage being supplied to the memory channel; and only performing the requesting and applying functions when the desired voltage is different from the current voltage being supplied to the memory channel. The method can limit when the requesting and applying functions are performed to only when the desired voltage is different from the current voltage being supplied to the memory channel, and the desired voltage does not change for a threshold time duration. Alternatively, the requesting and applying functions are performed only when the desired voltage is different from the current voltage being supplied to the memory channel, and the desired voltage does not change for at least a portion of a threshold time duration.

The function of determining a desired voltage can include comparing the requested throughput to a set of threshold throughput values, and setting the desired voltage equal to a threshold voltage value associated with the threshold throughput value closest to but less than the requested throughput. Alternatively, the function of determining a desired voltage can include plugging the requested throughput into a function relating throughput to voltage; and setting the desired voltage equal to the result of the function when plugging in the requested throughput.

Also disclosed is a memory power control apparatus for a multi-channel memory that includes a throughput detector system, a power control logic system and a power mode supply system. The throughput detector system determines a requested throughput for each channel of the multi-channel memory. The power control logic system determines a desired power mode associated with the requested throughput for each channel of the multi-channel memory. The power mode supply system, which is controlled by the power control logic system, supplies a desired voltage to each channel of the multi-channel memory. The memory power control apparatus can also include a plurality of memory controllers, where the throughput detector system is integrated into the plurality of memory controllers. Alternatively, the memory power control apparatus can include a memory crossbar with the throughput detector system integrated into the memory crossbar.

The memory power control apparatus can also include multiple memory controllers with each memory controller controlling one channel of the multi-channel memory. The throughput detector system and the power control logic system can be integrated into the multiple memory controllers.

The power mode supply system can include a power management circuit and a power distribution circuit. The power management circuit provides a plurality of selectable voltages. The desired voltage for each channel of the multi-channel memory is one of the plurality of selectable voltages. The power distribution circuit routes the desired voltage for each channel of the multi-channel memory to the appropriate channel.

In some embodiments, the power control logic of the memory power control apparatus only triggers the power mode supply system to supply the desired voltage to a channel of the multi-channel memory when the desired power mode for that channel remains unchanged for a threshold time duration.

For a more complete understanding of the present disclosure, reference is now made to the following detailed description and the accompanying drawings.

DETAILED DESCRIPTION

Figure 1:
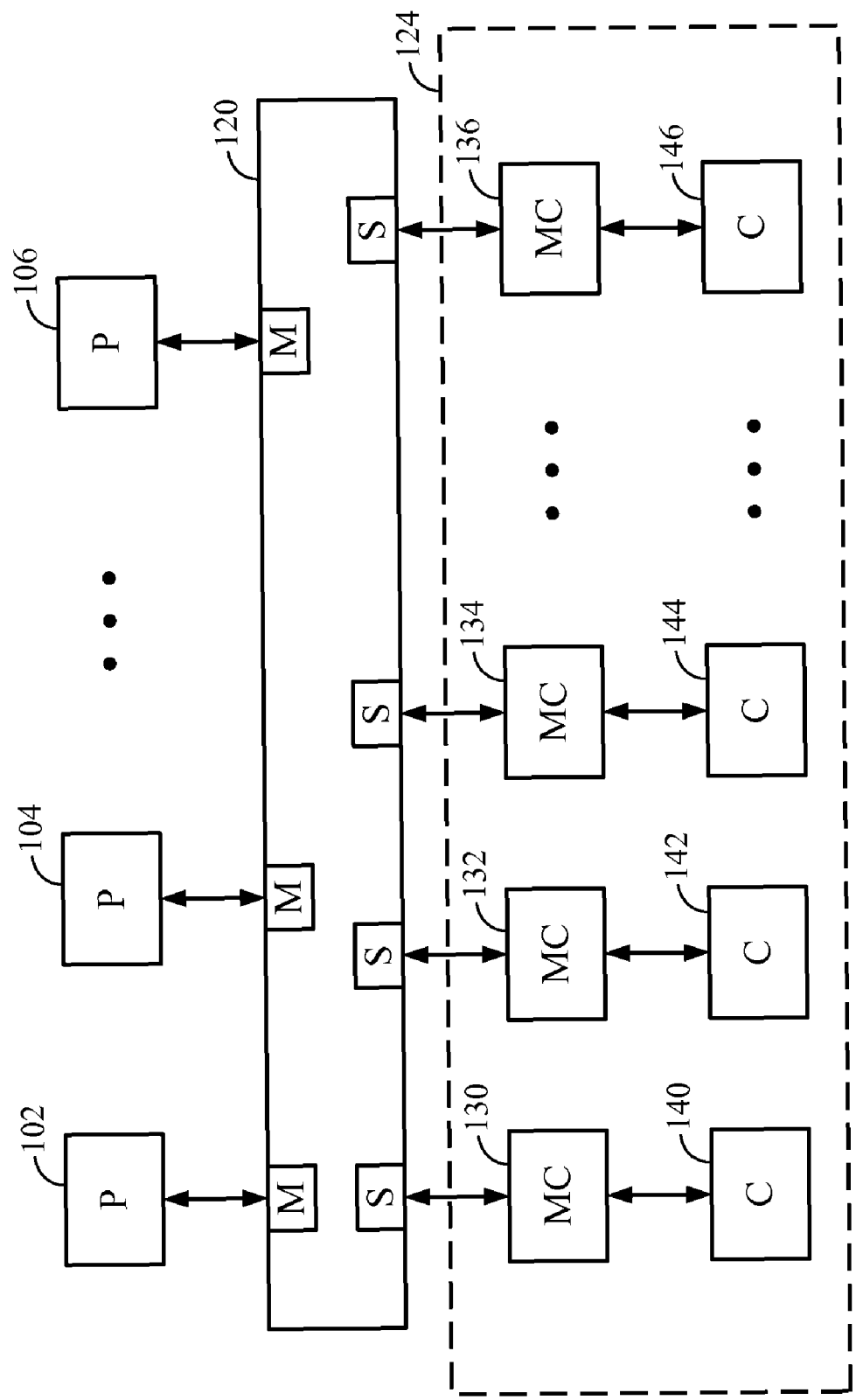
FIG. 1 is a schematic of a digital system with multi-channel memory.

FIG. 1 shows a schematic of a digital system 10 comprising a plurality of processors 102-106; a memory crossbar 120; and a multi-channel memory subsystem 124 which comprises a plurality of memory controllers 130-136, each of the memory controllers 130-136 being coupled to a memory channel 140-146. In this embodiment the memory crossbar 120 serves as an interface between the processors 102-106 and the multi-channel memory subsystem 124. Other interfaces between the processors and memory channels can also be used. The processors 102-106 are each coupled to the crossbar 120 as a master device (M) and the memory controllers 130-136 are each coupled to the crossbar 120 as a slave device (S). The processors 102-106 send memory requests to the crossbar 120, the memory requests are routed to the appropriate memory controller 130-136, the appropriate memory controller 130-136 accesses the associated memory channel 140-146 to fulfill the memory request and sends any necessary response back to the processor 102-106 that initiated the memory request.

Two important parameters in a digital system are system speed or performance and system power consumption. Power consumption is an especially important factor in mobile systems where it directly affects the amount of time a battery charge can power the system. The speed with which the memory requests of the processors 102-106 can be fulfilled by the memory subsystem 124 has a significant impact on the overall system speed. Thus, it is advantageous to maximize the throughput or bandwidth of the memory system 124 in order to increase the overall speed of the system. However, the memory subsystem 124 also impacts the power consumption of the overall system. The lower the voltage supplied to the memory channel, the lower the power consumed by the memory channel, but the lower the bandwidth of the memory channel, i.e., the slower the rate at which data can be read from or stored to the memory channel. Thus, there is a trade-off between memory bandwidth and memory power consumption.

A memory channel consumes different amounts of power depending on its state. The "power down" state uses the least power, but during the power down state, the memory channel cannot be accessed and entering and exiting the power down state has a significant performance overhead. In an "operation" state the memory channel consumes more power but it is ready to process memory requests. The operation state can have multiple levels or power modes. In general, levels with greater throughput or bandwidth will have greater power requirements. Each memory channel can operate in different power modes with different voltage and frequency. An exemplary embodiment of the multi-power mode system has three power modes: (1) high bandwidth/high power, (2) medium bandwidth/medium power, and (3) low bandwidth/low power. The power down feature can also be used as an additional power option in this memory architecture. In the low bandwidth/low channel mode, the memory channel can still be accessed unlike the power down mode.

In the embodiment shown in FIG. 1, the memory controller for each channel controls the power mode of the channel. For example, if the processors 102-106 are making frequent memory requests to the memory channel 140, then it would be desirable for the memory controller 130 to raise the voltage for the memory channel 140 to allow for increased bandwidth or throughput to fulfill the memory requests faster. Meanwhile, if the processors 102-106 are making less frequent memory requests to the memory channel 146, then it would be desirable for the memory controller 136 to adjust the voltage for the memory channel 146 to be in a medium or low power mode. And if the processors 102-106 are making even fewer memory requests of the memory channel 142 for an extended period of time, then it would be desirable for the memory controller 132 to adjust the voltage for the memory channel 142 to be in low power mode or even in power down mode.

As an example of the potential power savings, assume there are four memory channels with requested throughputs of 1.5 gigabytes per second (GB/s), 1 GB/s, 1 GB/s, and 1 GB/s, respectively. The former method would be to run all channels at the same power mode, for example 1.8 V and 333 Mhz with a power efficiency of 0.4 Watts/GB/s, which results in a total power consumption of:

$$0.4\ \text{Watts/GB/s} * (1.5+1+1+1)\text{GB/s} = 1.8\ \text{Watts}.$$

Assume that the higher throughput, 1.5 GB/s, has the above desired power mode but the slower rate of 1 GB/s has a desired power mode with voltage of 1.2 V, clock frequency of 266 Mhz and power efficiency of 0.14 Watts/GB/s. By running each channel at its desired power mode, the total power consumption is reduced to:

0.4 Watts/GB/s*1.5 GB/s+0.14 Watts/GB/s*(1+1+1) GB/s=1.0 Watts.

In this example, running the memory channels in multiple power modes reduced the total power consumption by more than 44%.

Figure 2:
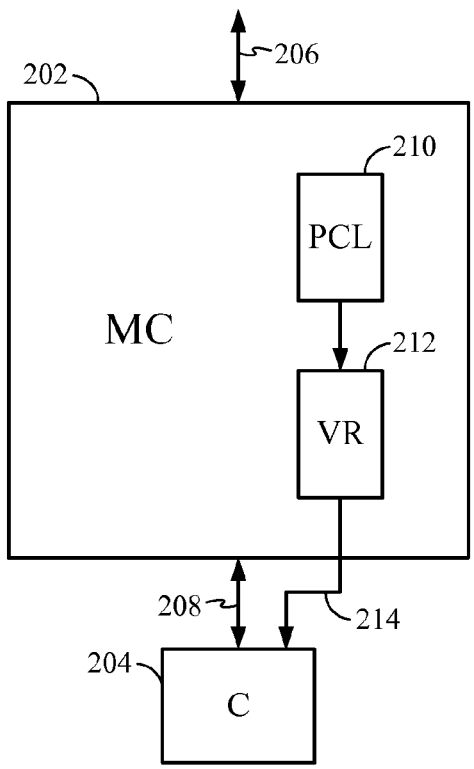
FIG. 2 is a schematic of a memory controller connected to a memory channel.

FIG. 2 shows an exemplary embodiment of a memory controller 202 coupled to a memory channel 204. The memory controller 202 can be exemplary of any of the memory controllers 130-136. The memory channel 204 can be exemplary of any of the memory channels 140-146. The memory controller 202 receives memory requests through lines 206 which couple the memory controller 202, directly or indirectly, to the processors 102-106. The memory controller 202 then communicates with the memory channel 204 across lines 208 to fulfill the memory requests. The memory controller 202 includes power control logic (PCL) 210 and a voltage regulator (VR) 212. The power control logic 210 keeps track of the requested memory throughput and determines a desired power level for the memory channel 204 based, at least in part, on the requested memory throughput. The desired power level may be determined by various methods, for example, using threshold values, a look-up table, or a function relating power mode to throughput. If the power control logic 210 determines that the power mode of the memory channel 204 should be changed to a new power mode, the power control logic 210 signals the voltage regulator 212 to change to the new power mode. The voltage regulator 212 then adjusts the voltage supplied to the memory channel 204 through a power connection 214. The voltage or voltages available to the voltage regulator 212 can be generated external to the memory controller 202, for example by a power management circuit for the system.

Figure 3:
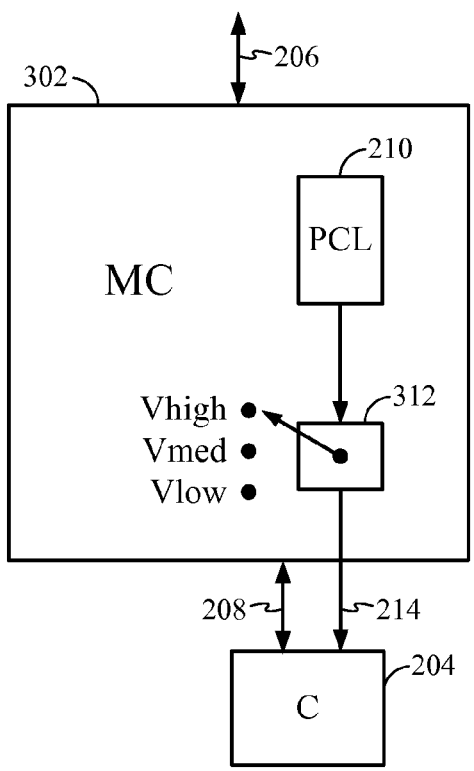
FIG. 3 is a schematic of an alternative embodiment of a memory controller connected to a memory channel.

FIG. 3 shows an alternative exemplary embodiment of a memory controller 302 coupled to the memory channel 204. The memory controller 302 can be exemplary of any of the memory controllers 130-136. The memory controller 302 receives memory requests through lines 206 which couple the memory controller 302 to the processors 102-106. The memory controller 302 then communicates with the memory channel 204 across lines 208 to fulfill the memory requests. The memory controller 302 includes power control logic (PCL) 210 and a voltage selector 312. In this illustrative schematic, the voltage selector 312 is shown as a switch with three voltage choices: $V_{high}$, $V_{med}$ and $V_{low}$. $V_{high}$ can be a high power/high bandwidth power mode; $V_{med}$ can be a medium power/medium bandwidth power mode; and $V_{low}$ can be a low power/low bandwidth power mode. As in FIG. 2, the power control logic 210 keeps track of the requested memory throughput and determines a desired power mode for the memory channel 204 based, at least in part, on the requested memory throughput. If the power control logic 210 determines that the power mode of the memory channel 204 should be changed to a new power mode, the power control logic 210 signals the voltage selector 312 to change to the new power mode. The voltage selector 312 then selects the voltage for the desired power mode which is supplied to the memory channel 204 through power connection 214. The voltages available to the voltage selector 312 can be generated external to the memory controller 302, for example by a power management circuit for the system.

Figure 4:
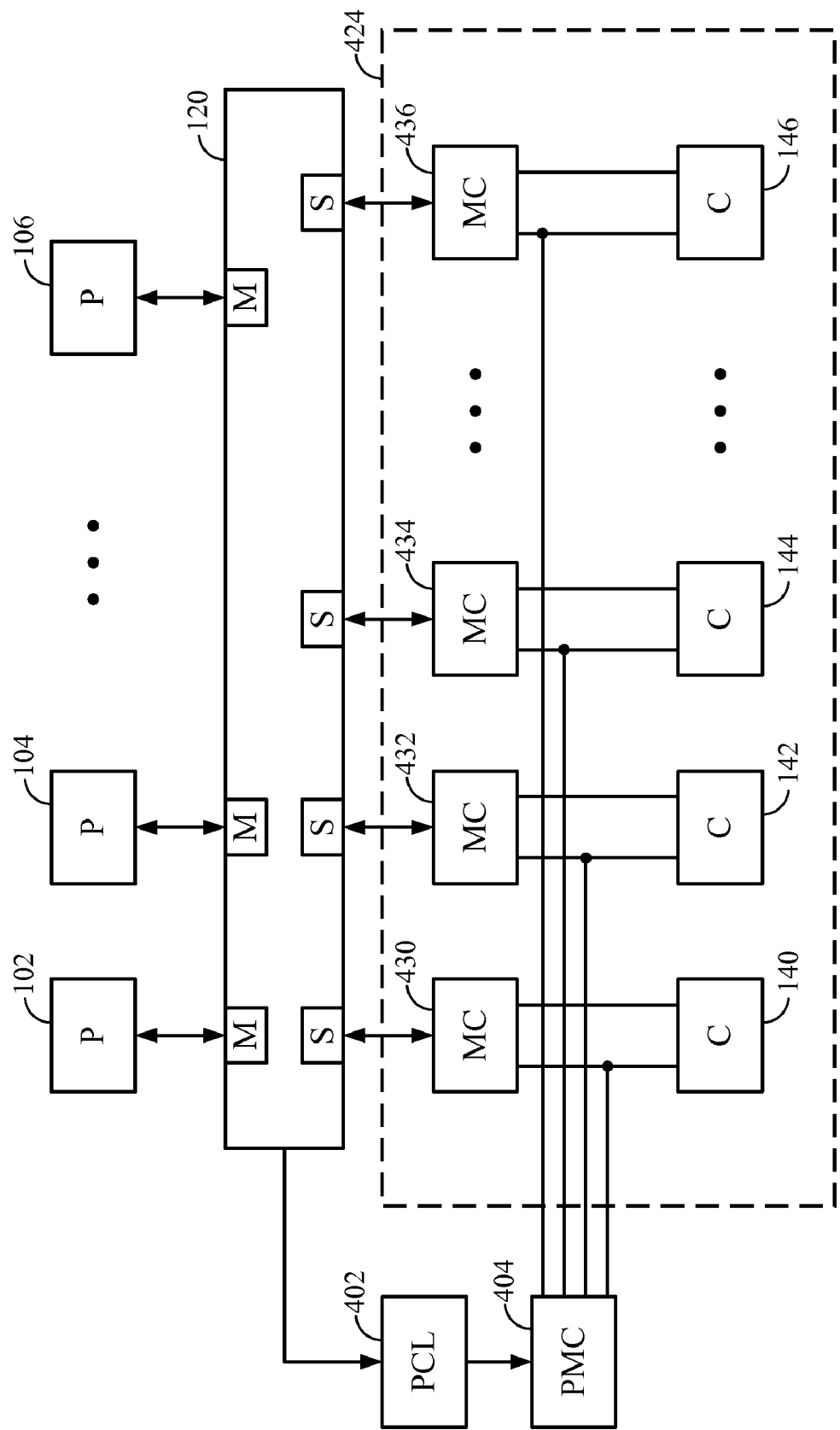
FIG. 4 is a schematic of an alternative digital system with multi-channel memory.

An alternative system embodiment is shown in FIG. 4, where the same reference numbers are used for similar elements. FIG. 4 includes the multiple processors 102-106 coupled through the memory crossbar 120 to a multi-channel memory system 424 comprising multiple memory controllers 430, 432, 434, 436 each coupled to memory channels 140, 142, 144, 146, respectively. The memory controllers 430-436 do not include power control logic or voltage control. In the system of FIG. 4, power control logic 402 is external to the memory controllers, and the power control logic 402 is coupled to a power management circuit 404. The power control logic 402 tracks the power mode of each memory channel. FIG. 4 shows an embodiment where the power control logic 402 is coupled to the memory crossbar 120 for receiving the requested throughput for each memory channel 140-146 from the memory crossbar 120. Alternatively, the power control logic 402 can be coupled to each of the memory controllers 430-436 and receive the requested throughput for each memory channel 140-146 from the memory controllers 430-436. The power control logic 402 determines a desired power mode for each of the memory channels 140-146 based, at least in part, on the requested memory throughput of the memory channel. If the power control logic 402 determines that the power mode of a particular memory channel should be changed to a new power mode, the power control logic 402 signals the power management circuit 404 to change to the new power mode for that particular memory channel. The power management circuit 404 then adjusts the voltage supplied to the particular memory channel through the connection between the power management circuit 404 and that particular memory channel. Alternatively, the power management circuit 404 can adjust the voltage supplied to both the particular memory channel and the memory controller associated with the particular memory channel.

Figure 5:
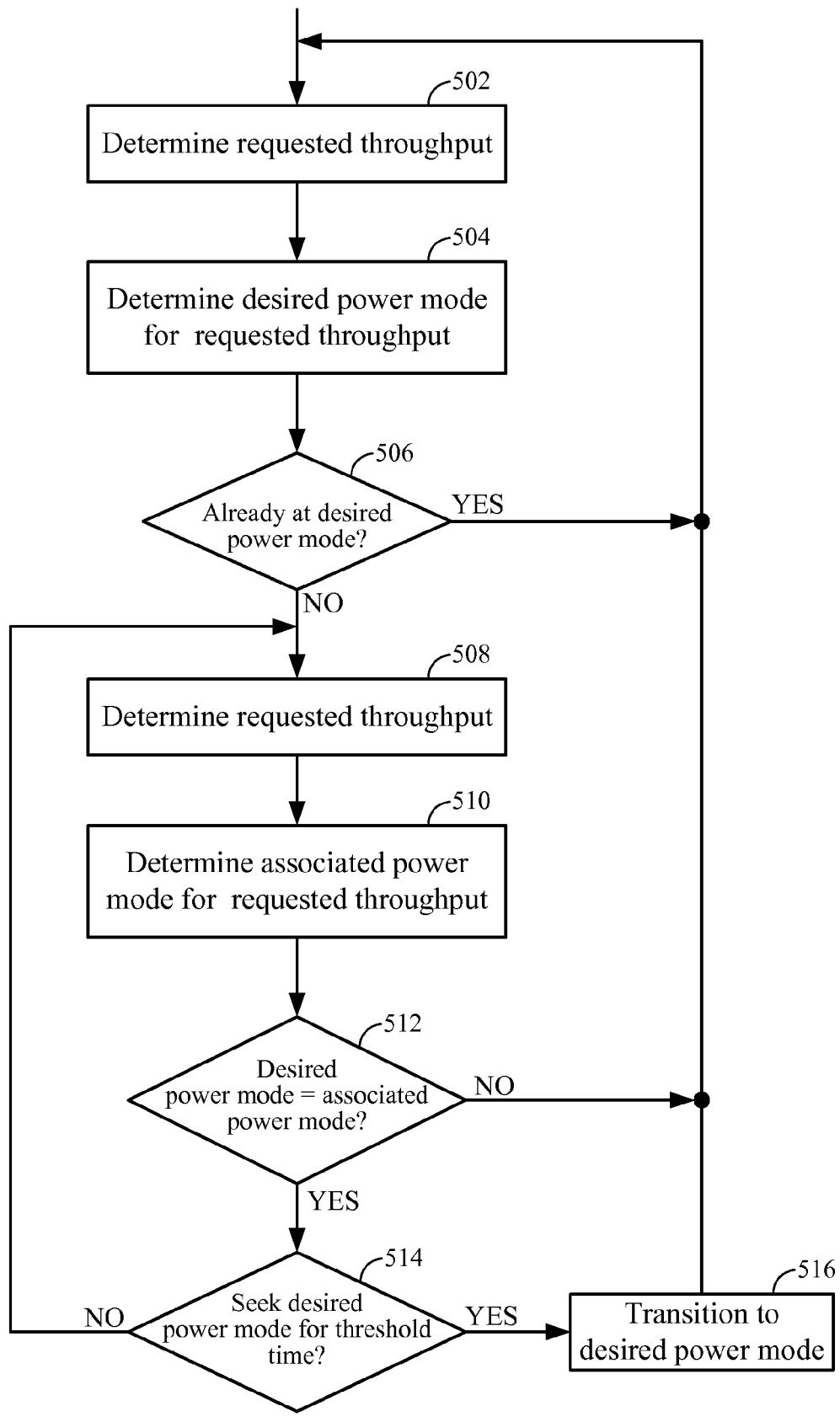
FIG. 5 is a flow diagram of an exemplary control algorithm for a power management system.

FIG. 5 provides a top-level flow diagram of an exemplary control algorithm for the power control logic (PCL) 402 or 210 to determine the power mode for a memory channel. For a multi-channel memory, this control logic can be duplicated for each channel, for example as in FIG. 2 or 3, or the control logic can control multiple memory channels, for example as in FIG. 4; and each channel can be powered at its particular desired power mode.

At block 502, the PCL determines the requested throughput for the memory channel. At block 504, the PCL determines the desired power mode for the requested throughput level found in block 502. At block 506, the PCL checks whether the memory channel is already operating at the desired power level. If the memory channel is already operating at the desired power level then control is passed back to block 502, otherwise control is passed to block 508. In an alternative embodiment, if the memory channel is not already operating at the desired power level then control is passed directly to block 516 where the PCL initiates transition of the memory channel to the desired power level, and then control is passed back to block 502.

At block 508, the PCL again determines the requested throughput for the memory channel. At block 510, the PCL determines the associated power mode for the requested throughput level found in block 508. At block 512, the PCL checks whether the desired power mode determined in block 504 is the same as the associated power mode determined in block 510. If the desired and associated power modes are not the same, then the memory channel is fluctuating between different desired power modes and control is transferred back to block 502. Otherwise, control is passed to block 514. In an alternative control algorithm, instead of returning directly to block 502 when the desired power mode changes, the algorithm can check whether the memory channel returns to the same desired power level in less than a short threshold time.

If the desired power level for the memory channel does return in the short threshold time, the algorithm passes control to block 514, otherwise it passes control to block 502.

At block 514, the PCL checks whether the memory channel has been seeking the same desired power mode for at least a threshold period of time. This threshold can be selected to prevent the PCL from rapidly shifting or bouncing between power modes. If the desired power mode has not been sought for the threshold period of time, then control is passed to block 508 to see whether the memory channel stays in the range for the desired power mode. If the desired power mode has been sought for at least the threshold period of time, then control is passed to block 516 where the PCL initiates the transition of the memory channel to the new desired power mode, after which control is passed back to block 502.

Figure 6:
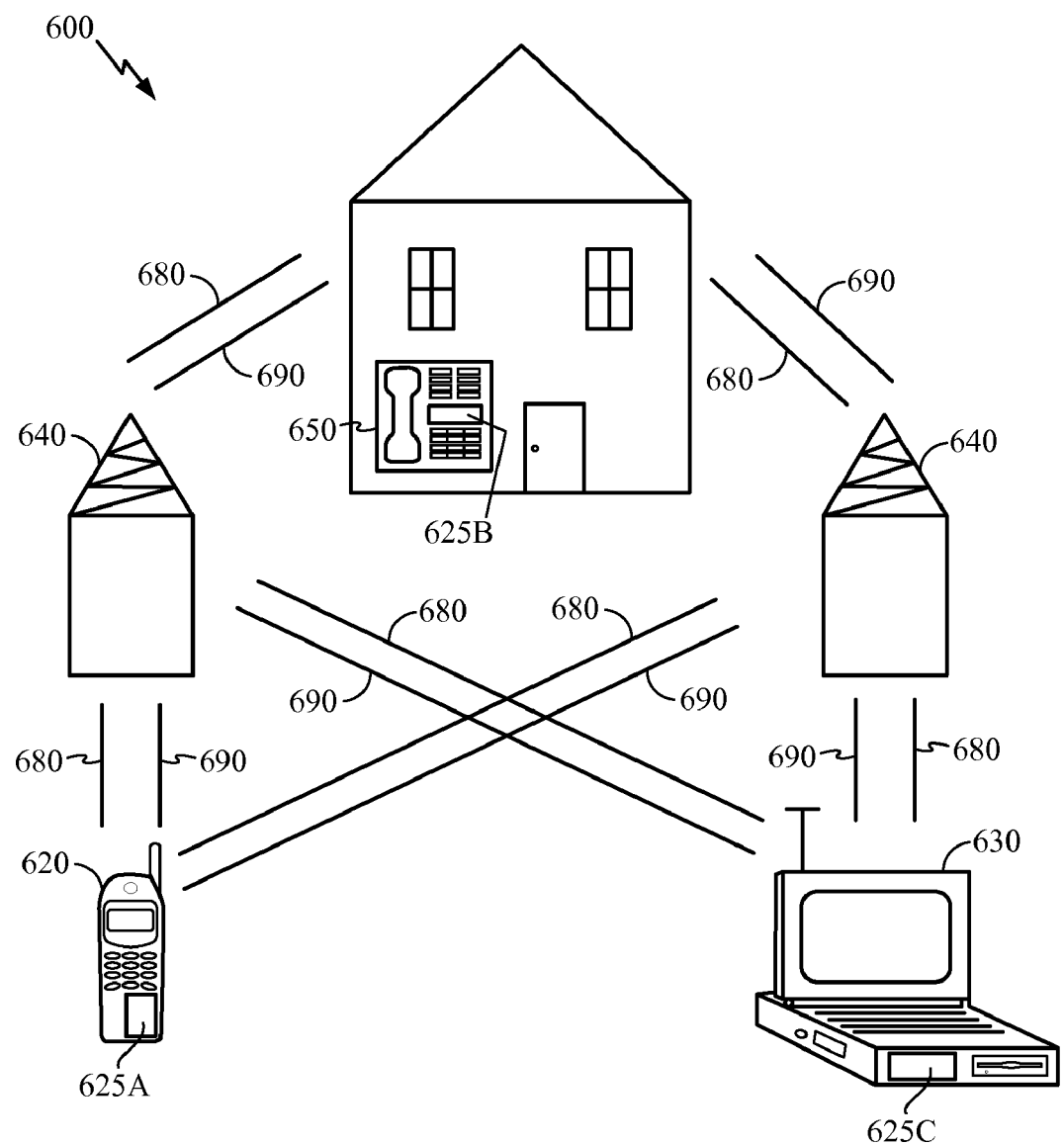
FIG. 6 is a block diagram showing an exemplary wireless communication system in which a memory power management system supporting multiple power modes may be advantageously employed.

FIG. 6 shows an exemplary wireless communication system 600 in which an embodiment of a memory power management system supporting multiple power modes may be advantageously employed. For purposes of illustration, FIG. 6 shows three remote units 620, 630, and 650 and two base stations 640. It should be recognized that typical wireless communication systems may have many more remote units and base stations. Any of remote units 620, 630, and 650 may include a memory power management system supporting multiple power modes such as disclosed herein. FIG. 6 shows forward link signals 680 from the base stations 640 and the remote units 620, 630, and 650 and reverse link signals 690 from the remote units 620, 630, and 650 to base stations 640.

In FIG. 6, remote unit 620 is shown as a mobile telephone, remote unit 630 is shown as a portable computer, and remote unit 650 is shown as a fixed location remote unit in a wireless local loop system. For example, the remote units may be cell phones, hand-held personal communication systems (PCS) units, portable data units such as personal data assistants, or fixed location data units such as meter reading equipment. Although FIG. 6 illustrates certain exemplary remote units that may include a memory power management system supporting multiple power modes as disclosed herein, the memory power management system is not limited to these exemplary illustrated units. Embodiments may be suitably employed in any electronic device in which a memory power management system supporting multiple power modes is desired.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A memory power management system supporting a plurality of power modes comprising:
    a memory controller configured to control a first memory channel;
    a throughput detector configured to detect a requested throughput of the first memory channel;
    power control logic configured to determine a desired power mode corresponding to the requested throughput of the first memory channel, the desired power mode being one of the plurality of power modes wherein the power control logic is further configured to:
        compare the requested throughput to a set of threshold throughput values, each threshold throughput of the set of threshold throughput values having an associated threshold voltage value; and
        set a desired voltage equal to the threshold voltage value associated with the threshold throughout value closest to but less than the requested throughout wherein the desired voltage value corresponds to the desired power mode: and
    a power control configured to supply the desired voltage to the first memory channel.

2. The memory power management system of claim 1, wherein the throughput detector and the power control logic are part of the memory controller.

3. The memory power management system of claim 1, wherein the power control device is a voltage regulator, the voltage regulator comprising:
    an input configured to receive a supply voltage; and
    a power circuit configured to transition the supply voltage to the desired voltage.

4. The memory power management system of claim 1, wherein the power control device is a voltage selector, the voltage selector comprising:
    a plurality of selectable voltages, each of the selectable voltages corresponding to one of the plurality of power modes; and
    a selector device configured to select the desired voltage, the desired voltage being one of the plurality of selectable voltages.

5. The memory power management system of claim 4, wherein the plurality of selectable voltages are supplied by a power management circuit.

6. The memory power management system of claim 1, further comprising a memory crossbar, the throughput detector being part of the memory crossbar.

7. The memory power management system of claim 1, further comprising:
    a plurality of memory controllers configured to control a multi-channel memory, each of the plurality of memory controllers controlling one channel of the multi-channel memory, the first memory channel being one of the channels of the multi-channel memory;
    wherein the throughput detector detects a channel requested throughput for each memory channel of the multi-channel memory; the power control logic determines a channel desired power mode for each memory channel of the multi-channel memory, the channel desired power mode corresponding to the channel requested throughput for that memory channel; and the power control device supplies a channel desired voltage to each memory channel of the multi-channel memory, the channel desired voltage corresponding to the channel desired power mode for that memory channel.

8. The memory power management system of claim 1, wherein the power control device also supplies the desired voltage to the memory controller.

9. A method for controlling a voltage applied to a memory channel, comprising:
    detecting a requested throughput for the memory channel using a throughput detector;
    determining a desired voltage related to the requested throughput using power control logic, wherein determining a desired voltage related to the requested throughput comprises:
        comparing the requested throughput to a set of threshold throughput values, each threshold throughput of the set of threshold throughput values having an associated threshold voltage value: and setting the desired voltage equal to the threshold voltage value associated with the threshold throughput value closest to but less than the requested throughput;
requesting the desired voltage from a voltage device; and
applying the desired voltage to the memory channel.

10. The method of claim 9, further comprising:
determining whether the desired voltage is different from a current voltage being supplied to the memory channel; and
only requesting and applying the desired voltage when the desired voltage is different from the current voltage being supplied to the memory channel.

11. A method for controlling a voltage applied to a memory channel, comprising:
detecting a requested throughput for the memory channel using a throughput detector;
determining a desired voltage related to the requested throughput using power control logic;
requesting the desired voltage from a voltage device;
applying the desired voltage to the memory channel;
determining whether the desired voltage is different from a current voltage being supplied to the memory channel; and if so performing the following:
storing the desired voltage as a potential new voltage;
continuing to detect a current requested throughput for the memory channel and to determine a current desired voltage related to the current requested throughput on a periodic basis for a threshold time duration;
checking whether the current desired voltage is equal to the potential new voltage; and
only requesting and applying the desired voltage when the desired voltage is different from the current voltage being supplied to the memory channel, and the current desired voltage remains equal to the potential new voltage for the threshold time duration.

12. A method for controlling a voltage applied to a memory channel, comprising:
detecting a requested throughput for the memory channel using a throughput detector;
determining a desired voltage related to the requested throughput using power control logic;
requesting the desired voltage from a voltage device;
applying the desired voltage to the memory channel;
determining whether the desired voltage is different from a current voltage being supplied to the memory channel; and if so performing the following:
storing the desired voltage as a potential new voltage;
continuing to detect a current requested throughput for the memory channel and to determine a current desired voltage related to the current requested throughput on a periodic basis for a threshold time duration;
checking whether the current desired voltage is equal to the potential new voltage; and
only requesting and applying the desired voltage when the desired voltage is different from the current voltage being supplied to the memory channel, and the current desired voltage remains equal to the potential new voltage for at least a portion of the threshold time duration.

13. A memory power control apparatus for a multi-channel memory, the memory power control apparatus comprising:
a throughput detector system configured to determine a requested throughput for each channel of the multi-channel memory;
a power control logic system configured to determine a desired power mode for each channel of the multi-channel memory, the desired power mode for each channel being associated with the requested throughput for that channel wherein the power control logic is further configured to:
compare the requested throughput for that channel to a set of threshold throughput values, each threshold throughput of the set of threshold throughput values having an associated threshold voltage value; and
set a desired voltage equal for that channel to the threshold voltage value associated with the threshold throughput value closest to but less than the requested throughput for that channel, wherein the desired voltage value for that channel corresponds to the desired power mode for that channel; and
a power mode supply system configured to supply the corresponding desired voltage to each channel of the multi-channel memory, the power mode supply system being controlled by the power control logic system.

14. The memory power control apparatus of claim 13, wherein the power mode supply system comprises:
a power management circuit, the power management circuit providing a plurality of selectable voltages, the desired voltage for each channel of the multi-channel memory being one of the plurality of selectable voltages; and
a power distribution circuit, the power distribution circuit adapted to route the desired voltage for each channel of the multi-channel memory to that channel.

15. The memory power control apparatus of claim 13, further comprising a plurality of memory controllers, the throughput detector system being integrated into the plurality of memory controllers.

16. The memory power control apparatus of claim 13, further comprising a memory crossbar, the throughput detector system being integrated into the memory crossbar.

17. The memory power control apparatus of claim 13, further comprising a plurality of memory controllers, each of the plurality of memory controllers controlling one channel of the multi-channel memory, wherein the throughput detector system and the power control logic system are integrated into the plurality of memory controllers.

18. The memory power control apparatus of claim 13, wherein the power control logic only triggers the power mode supply system to supply the desired voltage to one channel of the multichannel memory when the desired power mode for the one channel remains unchanged for a threshold time duration.

19. A system for controlling a voltage applied to a memory channel, comprising:
means for detecting a requested throughput for the memory channel using a throughput detector;
means for determining a desired voltage related to the requested throughput using power control logic, wherein the means for determining a desired voltage related to the requested throughput comprises:
means for comparing the requested throughput to a set of threshold throughput values, each threshold throughput of the set of threshold throughput values having an associated threshold voltage value; and
means for setting the desired voltage equal to the threshold voltage value associated with the threshold throughput value closest to but less than the requested throughput;
means for requesting the desired voltage from a voltage device; and
means for applying the desired voltage to the memory channel.

20. The system of claim 19, further comprising:
means for determining whether the desired voltage is different from a current voltage being supplied to the memory channel; and
means for only requesting and applying the desired voltage when the desired voltage is different from the current voltage being supplied to the memory channel.

21. The system of claim 19, further comprising:
means for determining whether the desired voltage is different from a current voltage being supplied to the memory channel; and if so performing the following:
means for storing the desired voltage as a potential new voltage;
means for continuing to detect a current requested throughput for the memory channel and to determine a current desired voltage related to the current requested throughput on a periodic basis for a threshold time duration;
means for checking whether the current desired voltage is equal to the potential new voltage; and
means for only requesting and applying the desired voltage when the desired voltage is different from the current voltage being supplied to the memory channel, and the current desired voltage remains equal to the potential new voltage for the threshold time duration.

22. The system of claim 19, further comprising:
means for determining whether the desired voltage is different from a current voltage being supplied to the memory channel; and if so performing the following:
means for storing the desired voltage as a potential new voltage;
means for continuing to detect a current requested throughput for the memory channel and to determine a current desired voltage related to the current requested throughput on a periodic basis for a threshold time duration;
means for checking whether the current desired voltage is equal to the potential new voltage; and
means for only requesting and applying the desired voltage when the desired voltage is different from the current voltage being supplied to the memory channel, and the current desired voltage remains equal to the potential new voltage for at least a portion of the threshold time duration.

\* \* \* \* \*